(12) United States Patent
Martin et al.

(10) Patent No.: US 8,167,993 B2
(45) Date of Patent: May 1, 2012

(54) ASPHALT EMULSION PRIMING COMPOSITIONS AND METHODS OF USE

(75) Inventors: Jean-Valery Martin, Hopewell, NJ (US); James Michael Hemsley, Jr., Pearl, MS (US)

(73) Assignee: Innophos, Inc., Cranbury, NJ (US)

( * ) Notice: Subject to any disclaimer, the term of this patent is extended or adjusted under 35 U.S.C. 154(b) by 244 days.

(21) Appl. No.: 12/195,227

(22) Filed: Aug. 20, 2008

(65) Prior Publication Data
US 2009/0176014 A1 Jul. 9, 2009

Related U.S. Application Data

(60) Provisional application No. 60/965,924, filed on Aug. 23, 2007.

(51) Int. Cl.
*C08L 95/00* (2006.01)
*B05D 5/10* (2006.01)

(52) U.S. Cl. ..................... 106/277; 106/284.4
(58) Field of Classification Search .................. 106/277, 106/284.4; 427/138
See application file for complete search history.

(56) References Cited

U.S. PATENT DOCUMENTS

| | | | |
|---|---|---|---|
| 4,209,337 A | 6/1980 | Wagner et al. | |
| 4,496,474 A | 1/1985 | Reck | |
| 5,271,767 A * | 12/1993 | Light et al. | 106/248 |
| 5,362,316 A * | 11/1994 | Paradise | 106/277 |
| 5,558,702 A * | 9/1996 | Chatterjee et al. | 106/277 |
| 5,667,576 A * | 9/1997 | Chatterjee et al. | 106/277 |
| 5,667,577 A * | 9/1997 | Chatterjee et al. | 106/277 |
| 5,928,418 A | 7/1999 | Tamaki et al. | |
| 6,494,944 B1 | 12/2002 | Wates et al. | |
| 6,511,954 B1 | 1/2003 | Wilbur et al. | |
| 6,540,822 B2 * | 4/2003 | Wates et al. | 106/277 |
| 6,730,158 B1 * | 5/2004 | Merritt | 106/274 |
| 6,840,991 B2 * | 1/2005 | Honma et al. | 106/284.4 |
| 7,037,955 B2 * | 5/2006 | Timcik et al. | 106/273.1 |
| 7,306,666 B2 * | 12/2007 | Timcik et al. | 106/273.1 |
| 7,767,015 B2 * | 8/2010 | Hurtado Aznar et al. | 106/277 |
| 2009/0064898 A1 | 3/2009 | Aznar et al. | |

FOREIGN PATENT DOCUMENTS

| | | | |
|---|---|---|---|
| RO | 119953 B1 | 6/2005 | |
| WO | WO 2007/034081 | * | 3/2007 |

OTHER PUBLICATIONS

"Terminology of Polymers Containing Ionizable or Ionic Groups and of Polymers Containing Ions", Hess, et al., Pure Appl. Chem., vol. 78, No. 11, pp. 2067-2074, 2006.

* cited by examiner

*Primary Examiner* — Helene Klemanski
(74) *Attorney, Agent, or Firm* — Joanne P. Will

(57) ABSTRACT

Asphalt emulsion compositions for use in priming a granular surface such as a road bed are provided. The asphalt emulsion comprises asphalt, an amphoteric emulsifier, and water. The asphalt emulsion priming composition may be used on road beds to prepare the road bed for paving. Application of the asphalt emulsion priming composition to a granular surface, such as a road bed, can provide several advantages, including reducing or eliminating dust generated by traffic on the granular surface.

12 Claims, 3 Drawing Sheets

ASPHALT EMULSION PRIMING COMPOSITIONS AND METHODS OF USE

PRIORITY CLAIM

This application claims priority under 35 U.S.C. §119 to U.S. Provisional Application No. 60/965,924 filed on Aug. 23, 2007, the entire contents of which are hereby incorporated by reference.

FIELD OF THE INVENTION

The present invention is directed in one aspect to asphalt emulsion compositions for use in priming a granular surface such as a road bed. The asphalt emulsion comprises asphalt, an amphoteric emulsifier, and water. In a second aspect, the present invention is directed to methods of using the asphalt emulsion priming composition on road beds to prepare the road bed for paving. Application of the asphalt emulsion priming composition to a granular surface, such as a road bed, can provide several advantages, including reducing or eliminating dust generated by traffic on the granular surface.

BACKGROUND OF THE INVENTION

Asphalt emulsion priming (AEP) consists of application of a low viscosity asphalt emulsion to an absorbent surface, such as a granular base, in preparation for paving using an asphalt surface course. Road construction typically involves preparation of a surface comprising a granular material, such as sand or gravel, for application of an asphalt surface course. The granular material is often graded and packed to form a relatively flat, uniform surface for paving. The asphalt surface course typically consists of asphalt and an aggregate which is mixed and applied to the surface of the prepared granular material in the road bed.

Asphalt emulsion priming compositions are formulated to penetrate rapidly into the absorbent surface to bind the granular material. Deep penetration is desirable to assure that the primed surface is not easily disrupted by traffic during road surfacing.

In addition to reducing airborne dust generated by wind or by traffic on the granular road surface, AEP provides several benefits. AEP can partially waterproof treated areas to make them resistant to water erosion prior to application of the asphalt surface course. This can reduce or eliminate the need to repair the granular surface after a rainfall. In addition, the AEP can provide an improved bond between the granular base and the asphalt surface course.

AEP compositions presently used typically include a petroleum distillate added to the asphalt. The petroleum distillate lowers the viscosity of the asphalt to improve the penetration of the asphalt into the granular base. One disadvantage of petroleum distillates is that vapors are released into the air as the AEP material sets. This constitutes a significant pollution source and potential health hazard for workers.

In addition, prior AEP compositions typically required an acidic or basic additive, such as hydrochloric acid or sodium hydroxide, to adjust the pH of the composition. These additives can contribute to corrosion of equipment, as well as create personnel safety or environmental concerns.

Accordingly, it is an object of the present invention to provide an AEP composition that does not require use of a petroleum distillate or an additive to adjust the pH of the composition, and has acceptable properties to adequately penetrate a granular surface.

Another object of the present invention is to provide methods of applying the AEP composition to a surface, such as a granular surface being prepared for paving.

Other advantages of the compositions and methods of the present invention will be apparent to those skilled in the art based upon the detailed description of preferred embodiments set forth below.

SUMMARY OF INVENTION

Figure 1:
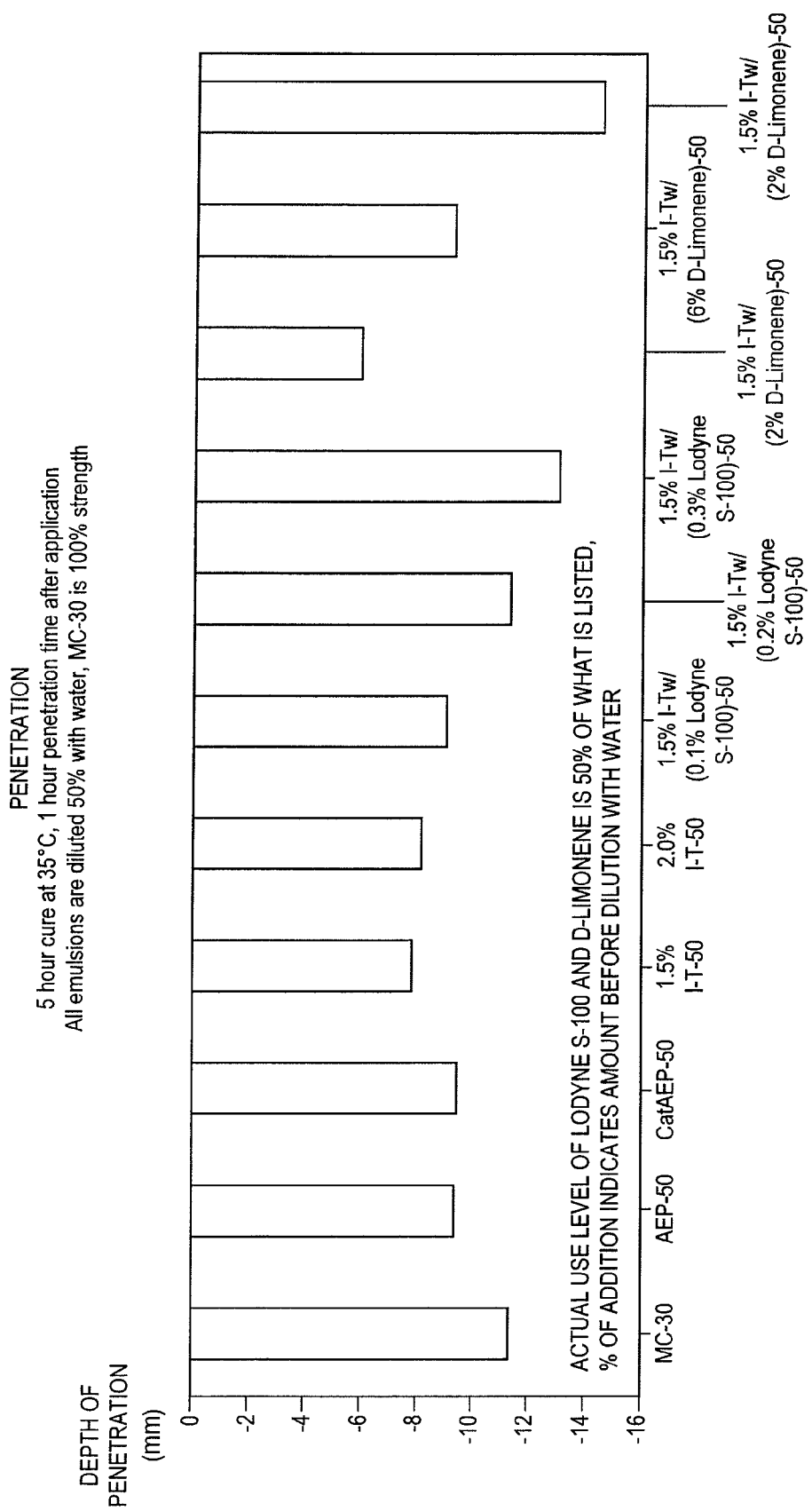
FIG. 1 is a chart showing the depth of penetration of the asphalt emulsion priming compositions described in Table 3.

The present invention is directed to an asphalt emulsion priming (AEP) composition that does not contain any petroleum distillates to adjust the viscosity of the asphalt composition. In addition, the AEP composition does not contain any acidic or basic additives, such as hydrochloric acid or sodium hydroxide, used to adjust the pH of the composition. The AEP composition comprises asphalt, water and an amphoteric emulsifier. Preferably, the amphoteric emulsifier is a betaine. If desired, other emulsifiers may also be added to the AEP composition.

Optionally, the AEP composition may include a polymer. Preferably, the polymer is selected from the group consisting of polyisoprene, polynorbornene, polybutadiene, butyl rubber, random ethylene/propylene (EP) copolymers, random ethylene/propylene/diene (EPDM) terpolymers, styrene-butadiene copolymers, styrene-butadiene-styrene block copolymers or acrylic polymers.

In one embodiment of the invention, the AEP composition also includes a natural oil extracted from plants. The natural oil may further improve the viscosity of the AEP composition. In a preferred embodiment, the natural oil is d-limonene. Unlike organic solvents formed from petroleum distillates, natural oils such as d-limonene do not present or create environmental or health hazards.

The AEP composition is typically first formulated as a concentrate that is further diluted with water for application to an absorbent surface, such as a granular surface which is being prepared for paving, to prime the surface. The AEP concentrate composition/water mixture has good penetration into a granular surface. The primed granular surface is resistant to water erosion, generates little or no dust in wind or from traffic over the surface, and provides a bond between the granular base and the asphalt pavement.

The AEP compositions of the present invention do not include any petroleum distillates to adjust the viscosity of the asphalt or the emulsion. In addition, there is no need to adjust the pH of the AEP composition using acidic or basic additives such as hydrochloric acid or sodium hydroxide.

DETAILED DESCRIPTION OF PREFERRED EMBODIMENTS

The present invention is directed generally to an AEP composition using amphoteric emulsifiers. The AEP compositions do not contain any organic solvents made from petroleum distillates. As a result, the AEP composition does not release volatile organics into the air that may cause environmental or human health problems.

The AEP compositions of the present invention comprise asphalt, an amphoteric emulsifier and water. In preferred embodiments, the AEP composition comprises between about 30% by weight to about 95% by weight asphalt, between about 0.1% by weight to about 3% by weight of an amphoteric emulsifier, and sufficient water to complete the emulsion to form the AEP composition. Preferably, the amount of water required is between about 10% by weight to 40% by weight. In a particularly preferred embodiment, the AEP composition comprises between about 60% to 65% by weight asphalt. The AEP composition is stable for extended storage. In preferred embodiments of the invention, the AEP composition is further diluted with water immediately prior to application to the granular surface. The diluted AEP composition is less stable for storage than the undiluted AEP composition.

No petroleum distillates are added to the AEP compositions of the present invention. In addition, the AEP composition does not require acidic or basic additives, such as for example hydrochloric acid or sodium hydroxide, to adjust the pH of the composition.

Any appropriate amphoteric emulsifier may be used in the present invention. In preferred embodiments, the amphoteric emulsifier is a betaine having either formula I or formula II:

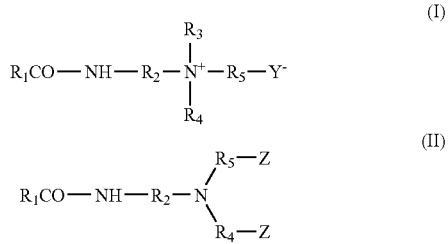

in which:

$R_1$ represents an aliphatic, saturated or unsaturated, linear or branched grouping having 6 to 24 carbon atoms;

$R_2$ is an aliphatic, saturated or unsaturated, linear or branched grouping having 2 to 6 carbon atoms, at least one of these carbon atoms being substituted if necessary by a hydroxy group;

$R_3$ and $R_4$, identical or different, represent an aliphatic, saturated or unsaturated, linear or branched grouping, consisting of 1 to 4 carbon atoms;

$R_5$, identical or different, is an aliphatic, saturated or unsaturated, linear or branched grouping consisting of 1 to 6 carbon atoms, at least one of these carbon atoms being substituted if necessary by a hydroxy group;

$Y^-$ is a $SO_3^-$ or $COO^{31}$ group; Z, identical or different, is a $SO_3^-$ or $COO^-$ or $OH$ group.

Combinations of amphoteric emulsifiers having formulas I or II above may also be used. In one preferred embodiment, the amphoteric emulsifier is cocoamidopropylbetaine. In another preferred embodiment, the amphoteric emulsifier is cocoamidohydropropylsultaine.

The AEP composition is prepared by heating the asphalt to reduce the viscosity of the asphalt sufficiently for emulsification. In a preferred embodiment, the asphalt is heated to a temperature of between about 130° C. and 180° C., and more preferably to a temperature of about 140° C. prior to mixing.

The amphoteric emulsifier and water are combined by mixing at a temperature ranging from about room temperature up to about 80° C.

The heated asphalt and the amphoteric emulsifier/water mixture are combined and fed to a colloidal mill (a high shear mixer) to create an emulsified asphalt-in-water AEP concentrate composition. The AEP concentrate is stable as an emulsion in storage for an extended time, and it can be used as a concentrate or combined with water as described below to prime a granular surface for paving.

Although the AEP concentrate composition described above may be applied directly to a granular surface to prime the surface for paving, in preferred embodiments, the AEP concentrate is further diluted with water prior to application to the granular surface to form a Penetrating Emulsion Primer (PEP). In embodiments of the invention in which the AEP concentrate is further diluted, the amount of water used in the PEP is selected to achieve a desired degree of penetration. In a preferred embodiment, the AEP concentrate is mixed with sufficient water to result in a mixture having between about 50% to about 70% water, and between about 30% to about 50% of the AEP composition.

The PEP is not stable for extended times and is typically applied to the granular surface within a short time after mixing. In use, the PEP is spread on the prepared absorbent surface, such as the granular surface of a road bed. The material is spread on the surface using equipment known to those skilled in the art. In preferred embodiments, the PEP is applied to the granular surface by spraying. Sufficient material is spread on the surface to achieve the desired penetration of the granular surface by a desired quantity of asphalt. Preferably, the AEP composition or the PEP is spread on the surface at a rate of about 2 kg/m² of asphalt. Where a PEP composition (diluted AEP composition) is used, the amount of the PEP spread depends on the degree of dilution. Preferably, the PEP is spread at a rate of between about 3 kg/m² to about 15 kg/m². If desired, multiple applications of the AEP composition or the AEP/water mixture may be spread on the surface to achieve the desired amount of asphalt on the granular surface.

After the AEP composition or the PEP composition is spread on the granular surface, it is allowed sufficient time to penetrate the granular surface and cure before any traffic is allowed to run on the surface. In a preferred embodiment, the AEP composition or the PEP composition is allowed to cure undisturbed on the surface for at least one hour, and preferably between about 3 hours and 5 hours.

In some embodiments of the invention, one or more polymers may be added to the AEP composition. The polymers used may be any known to those skilled in the art for use in asphalt compositions, such as polyisoprene, polynorbornene, polybutadiene, butyl rubber, random ethylene/propylene (EP) copolymers, random ethylene/propylene/diene (EPDM) terpolymers, styrene-butadiene copolymers, styrene-butadiene-styrene block copolymers or acrylic polymers. The polymer is preferably composed partially (the remaining part being composed of one or a number of polymers mentioned above or other polymers) or entirely of one or a number of random or block copolymers of styrene and of a conjugated diene, such as butadiene, isoprene, chloroprene, carboxylated butadiene or carboxylated isoprene, and more particularly of one or a number of copolymers chosen from block copolymers, with or without a random hinge, of styrene and of butadiene, of styrene and of isoprene, of styrene and of chloroprene, of styrene and of carboxylated butadiene or alternatively of styrene and of carboxylated isoprene. The copolymer of styrene and of conjugated diene, and in particular each of the abovementioned copolymers, preferably has a styrene content by weight ranging from 5% to 50%. The weight-average molecular weight of the copolymer of styrene and of conjugated diene, and in particular that of the copolymers described above, can be, for example, between 10,000 and 600,000 daltons and preferably lies between 30,000 and 400,000 daltons. The copolymer of styrene and of conjugated diene is preferably chosen from di- or tri-block copolymers of styrene and of butadiene, of styrene and of isoprene, of styrene and of carboxylated butadiene or alternatively of styrene and of carboxylated isoprene which have styrene contents and weight-average molecular weights which lie within the ranges defined above.

In some embodiments of the invention, one or more natural plant oils are added to the AEP or the PEP composition. The natural plant oils should be selected such that they do not cause any adverse environmental or human health effects. Preferably, the natural plant oil is an essential oil. In a particularly preferred embodiment the natural plant oil is d-limonene.

Preferably, the natural plant oil comprises up to about 35% by weight of the PEP composition. In a particularly preferred embodiment, the natural plant oil comprises between about 2% by weight and 15% by weight of the total weight of the PEP composition. The natural plant oil is preferably added to the dilution water prior to the addition of the AEP composition.

Surfactants may also be added to the PEP composition to improve the ability of the mixture to penetrate granular material. Any appropriate surfactant may be used in the PEP composition. In a preferred embodiment, the surfactant is Lodyne S-100.

Preferably, the surfactant comprises between about 0.01% to 5% by weight of the total weight of the PEP composition. The surfactant is preferably added to the dilution water before the addition of the AEP composition.

Although pH adjustment of the AEP composition is generally not required to use the composition to prime a granular surface, it may be desirable to adjust the pH due to the nature of the aggregate that will be used in the paving material to be applied to the surface. In these cases, the pH may be adjusted as desired using hydrochloric acid, sodium hydroxide or phosphoric acid.

The physical properties and penetration depths of several embodiments of the present invention are summarized in the Tables below. It should be understood that these are exemplary embodiments only, and the compositions described in the Examples provided below are not intended to limit the scope of the invention.

TABLE 1

Physical Characteristics of AEP Composition

| Asphalt Emulsion Prime | Specs | 1.5% Emulsifier | 1% Emulsifier | 0.5% Emulsifier |
|---|---|---|---|---|
| Sieve Test 850 micron Retained (immediate) | — | 0.001 | 0.013 | 0.002 |
| Settlement (5 days) (%) | <1 | 0.07 | 0.06 | 0.57 |
| Residue Distillation (%) | >65 | 66 | 65 | 65 |
| Viscosity Saybolt Furol @ 50 C. (s) | 15-150 | 26 | 22 | 20 |
| Particle size (μm) | — | 3.08 | 3.18 | 5.21 |
| pH | — | 7.89 | 7.88 | 7.97 |

TABLE 2

Physical Characteristics of 50/50 Mix of AEP with Water

| Emulsifier (%) | 1.5 | 1 | 0.5 |
|---|---|---|---|
| SIEVE, % | 0.005 | 0.001 | 0.03 |
| 50° C. SFS VISCOSITY (s) | 11 | 9 | 9 |
| EMULSION pH | 8.33 | 8.45 | 8.43 |
| PARTICLE SIZE, um | 1.91 | 1.98 | 3.02 |
| RESIDUE, % | 29 | 28 | 27 |

The penetration depth was measured for prior art compositions using a petroleum distillate organic solvent and compared to the penetration depth for various embodiments of the compositions of the present invention. In the examples summarized in Table 3 and shown in FIG. 1, the mixture of the AEP composition and water were 50/50 by weight. The amounts of emulsifier, surfactant or natural plant oil are relative to the total weight of the AEP/water mixture. These results demonstrate that the AEP compositions of the present invention have penetration depths that are equal or superior to compositions that use a petroleum distillate organic solvent.

TABLE 3

Penetration depth for 50/50 AEP/Water compositions

| Emulsion type | 5 Hour Penetration (mm) |
|---|---|
| A (organic solvent)(prior art) | −11.3 |
| B (organic solvent)(prior art) | −9.4 |
| C (organic solvent)(prior art) | −9.5 |
| 0.5% Emulsifier | −6.9 |
| 1.5% Emulsifier | −7.9 |
| 2.0% Emulsifier | −8.3 |
| 1.5% Emulsifier w/(0.1% Lodyne S-100) | −9.2 |
| 1.5% Emulsifier w/(0.2% Lodyne S-100) | −11.4 |
| 1.5% Emulsifier w/(0.3% Lodyne S-100) | −13.3 |
| 1.5% Emulsifier w/(2% D-Limonene) | −6.2 |
| 1.5% Emulsifier w/(6% D-Limonene) | −9.5 |
| 1.5% Emulsifier w/(10% D-Limonene) | −14.9 |

Figure 2:
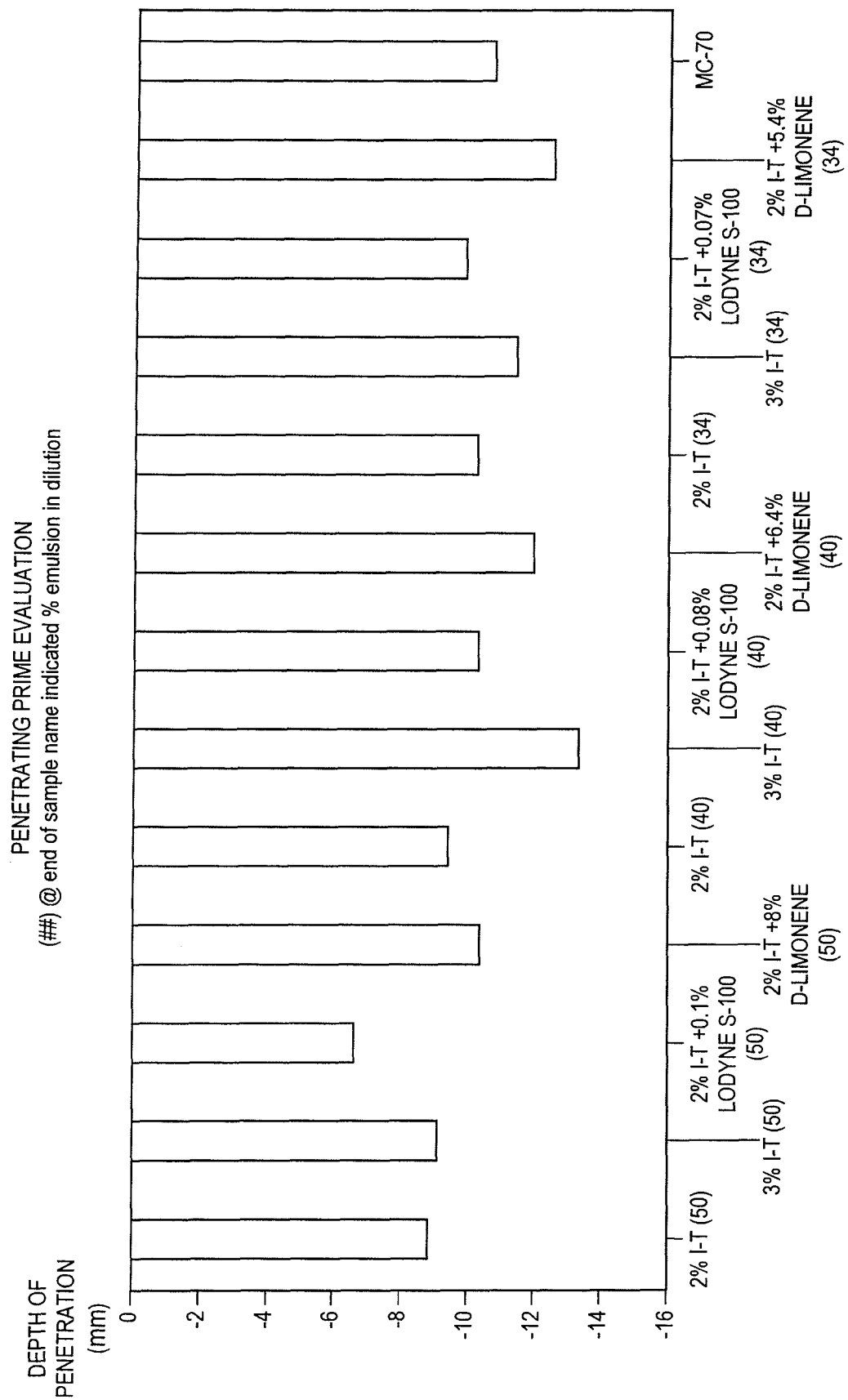
FIG. 2 is a chart showing the depth of penetration of the asphalt emulsion priming compositions described in Table 4 in Red Clay Sand.
Figure 3:
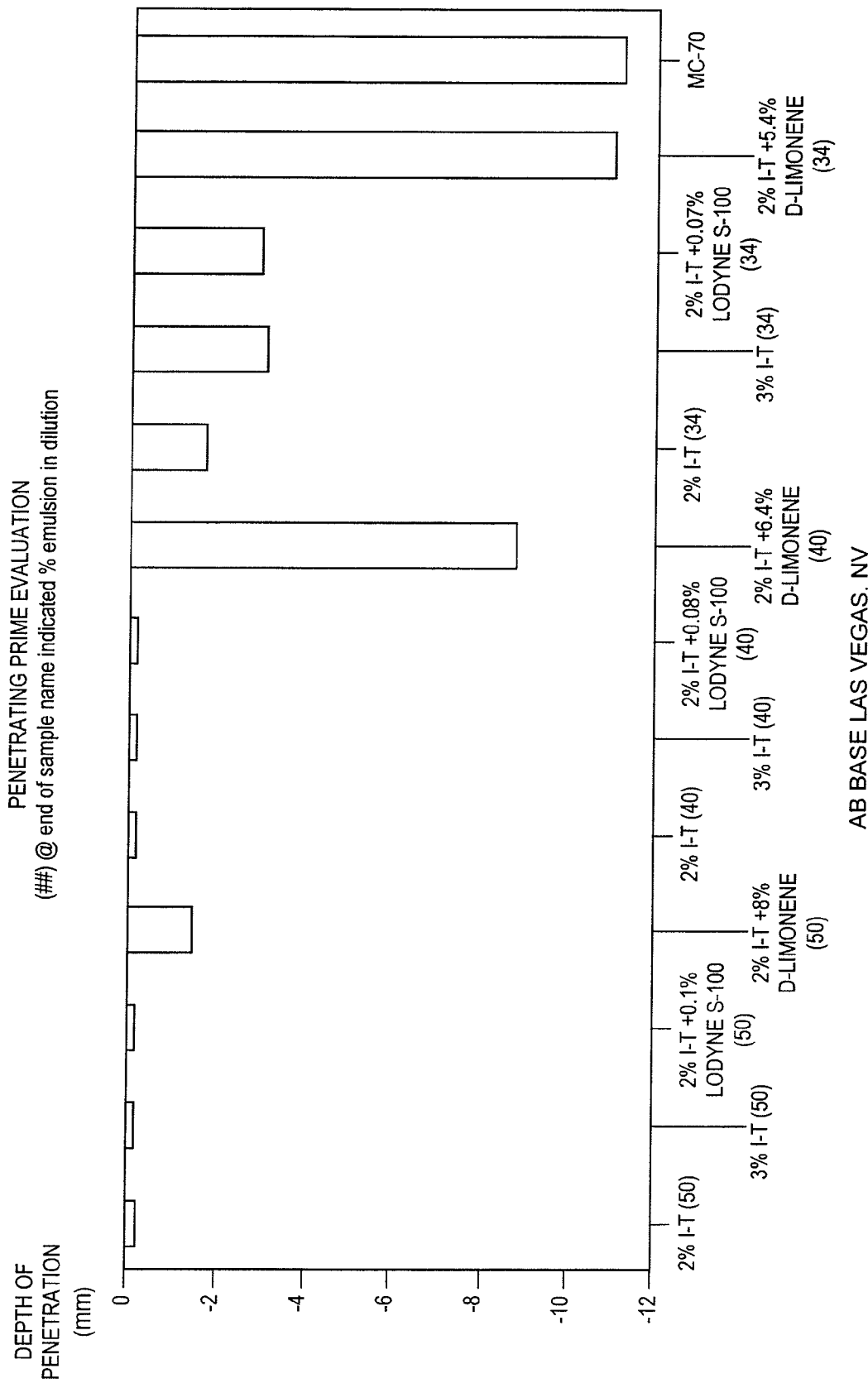
FIG. 3 is a chart showing the depth of penetration of the asphalt emulsion priming compositions described in Table 4 in AB Base.

Additional penetration tests were performed on AEP/water mixtures varying the relative amounts of the AEP and water in the mixtures. These tests were conducted on AB Base material from the Las Vegas, Nev. area. Red Clay Sand from Jackson, Miss, was used as a control. In formulations using a surfactant (Lodyne S-100) or a natural plant oil (d-limonene) the surfactant or natural oil to the water used to mix with the AEP composition. The figures in parentheses are the weight percentage of the AEP composition in the final mixture. The results of the testing are summarized in Table 4 and FIGS. 2 and 3.

TABLE 4

Penetration Depth for AEP/Water Mixtures

| | Additives | |
|---|---|---|
| % Emulsifier | Red Clay Sand (mm) | AB Granular Base (mm) |
| 2% Emulsifier (50) | −8.8 | −0.1 |
| 3% Emulsifier (50) | −9.0 | −0.1 |
| 2% Emulsifier/0.1% Lodyne S-100 (50) | −6.6 | −0.1 |
| 2% Emulsifier/8% d-Limonene (50) | −10.4 | −1.42 |
| 2% Emulsifier (40) | −9.4 | −0.1 |
| 3% Emulsifier (40) | −13.4 | −0.1 |
| 2% Emulsifier/0.08% Lodyne S-100 (40) | −10.3 | −0.1 |
| 2% Emulsifier/6.4% d-Limonene (40) | −12.0 | −8.76 |
| 2% Emulsifier (34) | −10.3 | −1.72 |
| 3% Emulsifier (34) | −11.4 | −3.05 |

TABLE 4-continued

Penetration Depth for AEP/Water Mixtures

| % Emulsifier | Additives | |
|---|---|---|
| | Red Clay Sand (mm) | AB Granular Base (mm) |
| 2% Emulsifier/0.07% Lodyne S-100 (34) | −9.9 | −2.98 |
| 2% Emulsifier/5.4% d-Limonene (34) | −12.6 | −10.99 |
| MC-70 (Prior Art) | −10.7 | −11.18 |

An example of the method for preparing a quantity of the AEP composition on a laboratory scale is provided below. The process for preparing the AEP composition is intended to be exemplary only, and it is not intended to limit the scope of the invention in any way.

A mill that operates on gravity flow, sometimes referred to as a Benedict mill, is used to mix the emulsifier and the asphalt. The mill has a pumping capability to circulate a quantity of the product to a reservoir. The mill includes a rotor that is 7.5 inches in diameter and operates at about 3450 rpm. The gap between the rotor and stator is 0.025 inches. The typical batch size using this equipment is about 3000 grams.

The mill is first preheated using hot water. The emulsifier solution is prepared on a bench and placed in an oven to maintain the desired temperature, typically between 100° F. and 140° F. Asphalt blends are also prepared on the bench and placed in an oven to maintain the temperature at about 290° F. The emulsifier solution, at temperature, is poured into the reservoir, and asphalt is then added to the reservoir over a period of several seconds. During asphalt addition, the material in the reservoir is stirred by hand with a metal spatula. After the asphalt is added to the reservoir, the mill is run and the material is recirculated through the reservoir for a period of about 60 seconds. The material is then discharged from the mill into a container for testing.

While preferred embodiments have been shown and described, various modifications may be made to the processes described above without departing from the spirit and scope of the invention as described in the appended claims. Accordingly, it is to be understood that the present invention has been described herein by way of example and not by limitation.

We claim:

1. An asphalt emulsion composition for use in priming a granular surface comprising:
   (a) between about 9% by weight to less than 28.5% by weight asphalt;
   (b) between about 0.03% by weight and about 0.9% by weight of an amphoteric emulsifier; and
   (c) between about 90.9% by weight and about 71.5% by weight water.

2. The asphalt emulsion composition of claim 1, wherein the amphoteric emulsifier has one of formula I or formula II:

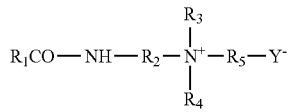

(I)

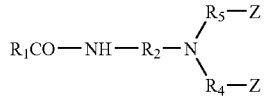

(II)

in which:

R₁ represents an aliphatic, saturated or unsaturated, linear or branched grouping having 6 to 24 carbon atoms;

R₂ is an aliphatic, saturated or unsaturated, linear or branched grouping having 2 to 6 carbon atoms;

R₃ and R₄, identical or different, represent an aliphatic, saturated or unsaturated, linear or branched grouping, consisting of 1 to 4 carbon atoms;

R₅ is an aliphatic, saturated or unsaturated, linear or branched grouping consisting of 1 to 6 carbon atoms;

Y⁻ is a $SO_3^{31}$ or $COO^{31}$ group;

Z, identical or different, is a $SO_3^{31}$ or $COO^{31}$ or OH group.

3. The asphalt emulsion composition of claim 1, wherein the amphoteric emulsifier is one of cocoamidopropylbetaine or cocoamidohydropropylsultaine.

4. The asphalt emulsion composition of claim 3, wherein the composition comprises between about 18% to 25% asphalt.

5. A process for producing an asphalt emulsion primer from an asphalt emulsion primer concentrate comprising the steps of:
   (a) heating a quantity of asphalt to reduce the viscosity of the asphalt;
   (b) mixing an amphoteric emulsifier with water to produce an amphoteric emulsifier solution;
   (c) mixing the heated asphalt and the amphoteric emulsifier solution to produce an asphalt-in-water emulsion primer concentrate; and
   (d) mixing the asphalt-in-water emulsion primer concentrate with water to produce an asphalt emulsion primer, wherein the resulting asphalt emulsion primer comprises between about 9% by weight to less than 28.5% by weight asphalt.

6. The process of claim 5, wherein the asphalt emulsion primer comprises between about 9% by weight to less than 28.5% by weight asphalt, between about 0.03% by weight to about 0.9% by weight of an amphoteric emulsifier, and between about 90.9% by weight and about 71.5% by weight water.

7. A process for asphalt priming a granular surface comprising the steps of:
   (a) providing an asphalt emulsion primer composition of any one of claims 1 and 2-4; and
   (b) spraying the asphalt emulsion primer composition on a granular surface.

8. The process of claim 5, further including the step of adding a natural plant oil to the water mixed with the asphalt emulsion primer concentrate.

9. The process of claim 8, wherein sufficient natural plant oil is added to the water to result in a concentration of the natural plant oil between about 2% by weight and 15% by weight of the total weight of the asphalt emulsion primer composition.

10. The process of claim 9, wherein the natural plant oil is d-limonene.

11. The process of claim 5, further including the step of adding sufficient surfactant to the water mixed with the asphalt emulsion primer concentrate to result in a concentration of the surfactant of between about 0.01% by weight and 5% by weight of the total weight of the asphalt emulsion primer composition.

12. The process of claim 7, wherein the asphalt emulsion primer is sprayed on the granular surface at a rate of about 2 kg asphalt per square meter.

\* \* \* \* \*